Fig.1.

Patented June 14, 1927.

1,632,048

UNITED STATES PATENT OFFICE.

JOHN W. VAN DE WATER, OF HASTINGS-ON-THE-HUDSON, AND BERT R. BLAIR, OF JACKSON HEIGHTS, NEW YORK, ASSIGNORS TO WESTERN ELECTRIC COMPANY, INCORPORATED, OF NEW YORK, N. Y., A CORPORATION OF NEW YORK.

TESTING SYSTEM.

Application filed January 16, 1926. Serial No. 81,665.

This invention relates to testing systems, and particularly to an improved arrangement for testing the operating characteristics of various types of answering jacks and their associated line circuit apparatus, and is an improvement of the testing system disclosed in the patent to Lawson et al., No. 1,617,336, granted February 15, 1927.

In the testing system, as disclosed in the above mentioned patent, there are means provided whereby operating tests of a plurality of standard answering jack circuits and their corresponding line and cut-off relays may be performed automatically and without shifting the testing set, as well as means whereby various unstandard conditions that may arise in these jack circuits and associated apparatus may be observed and analyzed.

It is an object of this invention to improve and extend the utility of systems of the above type by including in a single test set means for testing and measuring the operating characteristics of a plurality of different types of answering jack circuits and their associated apparatus and for further observing and analyzing unstandard conditions that may arise in such various types of jack circuits and their associated apparatus.

A feature of this invention is the provision of means whereby not only operating tests in accordance with the above mentioned system may be performed, but also to provide additional equipments whereby so-called adjustment tests may be performed. That is, means is provided whereby the actual operating and release characteristics of the cut-off and line relays of the jack circuits under test may be determined and whereby the values of these electrical characteristics may be measured.

Another feature of the invention is the provision of means in a testing system of the above type whereby, in addition to the continuity tests of the tip conductors of the jack circuits, there may be determined whether or not the characteristics of the electrical circuit through the tip conductors are above or below a certain predetermined value and whereby if the electrical characteristics are below the predetermined value the continuing of the testing of the succeeding jack circuits is prevented.

Another feature is the provision in the system of the above type of means whereby the automatic test of any particular jack circuit may be made to the exclusion of the testing of any of the other circuits. Such means may be controlled from the handles or holders of the multiple plugs used for connecting a group of answering jacks with the jacks of the test set.

Another feature is the provision in a system of the above type of means whereby if the standard sleeve circuit tests are not successful, the nature and origin of the unstandard conditions occurring in these circuits may be determined.

Another feature is the provision of means whereby special answering jack circuits may be tested, such for example, as those that have a direct ground on the tip conductor or jack circuits that are associated with subscribers' lines equipped with coin-collecting apparatus. Another feature of the invention is the provision of various signalling means in testing systems of this type such as, for example: an audible signal that operates after the tests of all of the answering jacks in a group have been successfully completed; visual signals for indicating whether an adjustment test of a line relay or a continuity test of a jack circuit is being performed and visual signals to indicate whether or not the electrical characteristics of the sleeve circuits are below or above a certain predetermined value.

Other features for analyzing unstandard conditions are provided by this invention such as, means for detecting a ground between the cut-off and line relays on the tip conductor; a ground between a jack and a corresponding cut-off relay on the tip conductor and a grounded sleeve circuit or false ground or battery on the tip or ring conductors.

Another feature is the provision of means including an artificial line whereby the functioning of the test set itself may be checked.

This invention will be described with the aid of the accompanying drawings in which Fig. 1 illustrates a circuit for a test set arranged in accordance with this invention and Fig. 2 illustrates a plurality of answering jacks to be tested, one of which has been shown with its essential line and cut-off relays wired in accordance with the usual wiring of standard circuits of this type. There is also shown in this figure a multiple contact case for connecting the jacks forming part of the test set with the said answering jacks. For this figure there is also shown a plurality of other jacks and circuits including an artificial line arrangement, being part of the test set whereby the test set itself may be tested. Fig. 3 illustrates the wiring of one of a plurality of another type of answering jack that may be tested by this set while Fig. 4 illustrates the wiring of a third type of answering jacks that may be tested by this set, namely, a jack associated with a subscriber's line and equipped for coin collecting service.

Figure 1:
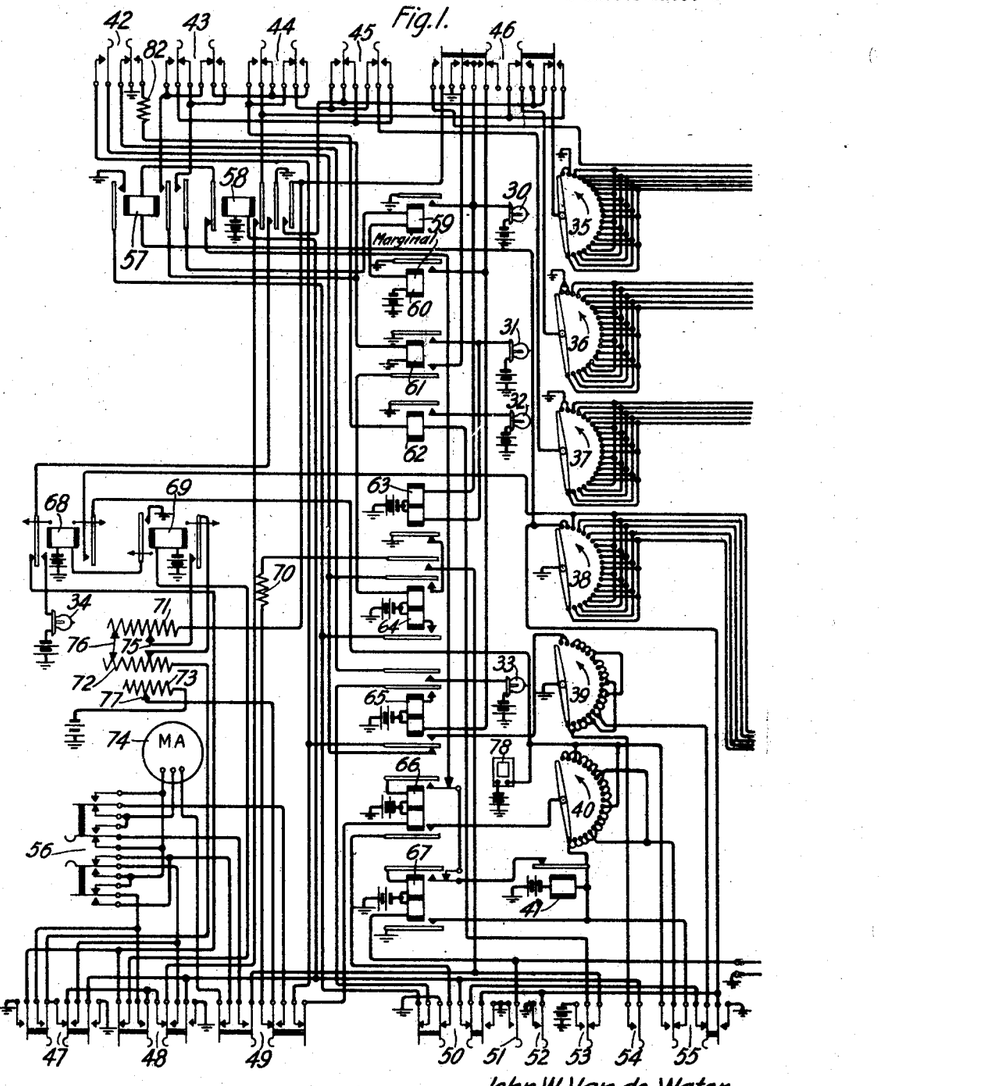
Figures 2, 3, 4:
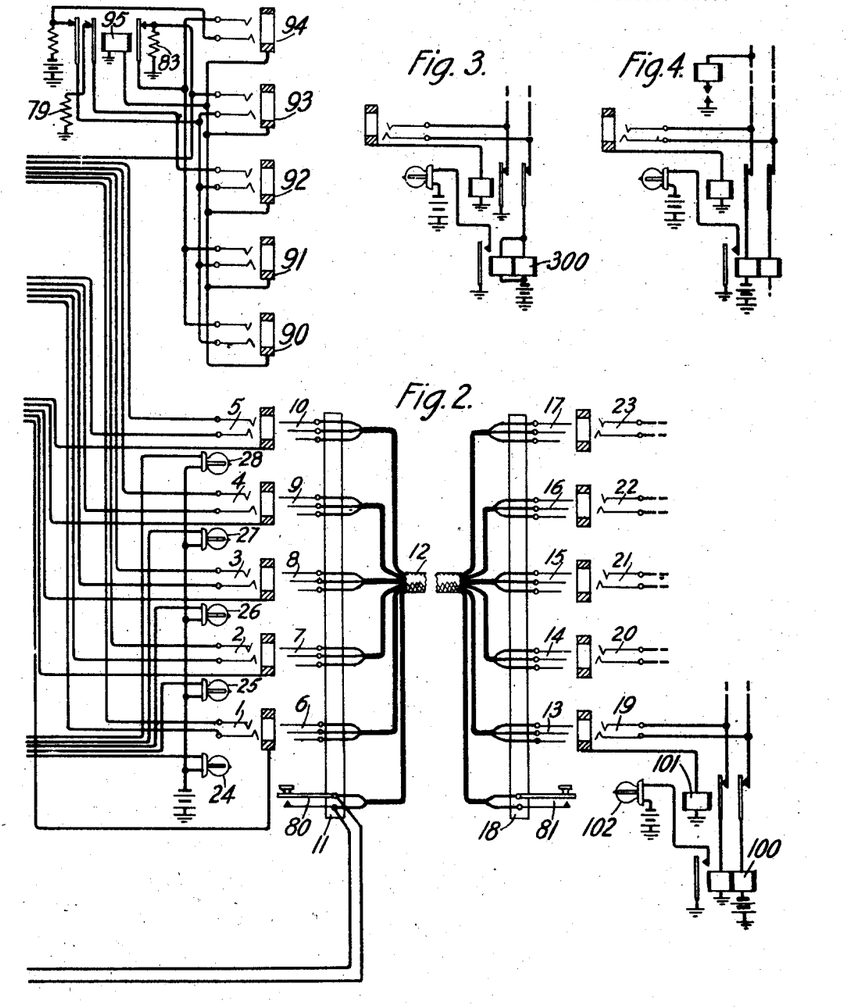

Referring now to the drawings a test set is illustrated therein arranged for the testing of five answering jack circuits at one time, without shifting the manual connections between the set and the five answering jacks. To this end, the set is provided with five jacks 1 to 5 into which the individual plugs 6 to 10 are arranged in a single holder 11 may be respectively and simultaneously inserted. The conductors of these plugs 6 to 10 may be arranged in a single cord 12 and may terminate at the opposite end in corresponding plugs 13 to 17 arranged in a single holder 18. The plugs 13 to 17 are therefore similarly adapted to be inserted simultaneously into five answering jacks to be tested such as jacks 19 to 23. The circuit for jack 19 and its associated line and cut-off relays have been shown in detail. Associated with jacks 1 to 5, are signal lamps 24 to 28 which are arranged with a plurality of other signal lamps such as 30 to 34 in the test set to variously indicate the progress and outcome of the different tests performed by the set as will hereinafter be described. To automatically advance the testing from one answering jack circuit to another there is provided a series of automatically operating rotary switches 35 to 40 which may be actuated by the stepping magnet 41 to advance the brush contact thereof one step at the time to establish connection with one set of terminals after another. To start the test set operations and to manipulate it to perform a number of different tests, a series of manually operated keys are provided. These keys are numbered 42 to 56. Other circuit connections during the testing operations are performed by a plurality of relays, such as 57 to 69. A resistance 70 and three adjustable resistances 71 to 73 and a milliammeter 74 are other apparatus provided in this set for checking the electrical characteristics of the circuits to be tested as will hereinafter be described.

To bring out the various features of the invention as embodied in this test set, a description will now be made of the various tests that may be performed thereby. These tests may be described as operating and adjustment tests of the cut-off and line relays of five answering jack circuits and may be divided into three groups. The first is the operation or continuity tests of the answering jack conductors and the second is the adjustment tests of the cut-off relays while the third is the adjustment tests of the line relays, the last two tests relating to the checking and measuring the operating characteristics of cut-off and line relays.

To enable the test set to perform these tests, jacks 1 to 5 are connected through to jacks 19 to 23, respectively, by means of the cord 12, and to start the continuity tests key 52 is operated. The operation of this key closes a circuit for relay 57 as follows: battery, winding of stepping magnet 41, armature and back contact of this stepping magnet, normal make-before-break contacts of relays 67 and 66, left-hand armature and back contact of relay 58, winding of relay 57, contacts of key 52 to ground. Relay 57 operates in this circuit and closes circuits through from the line relay 100 associated with jack 19 as follows: one circuit from ground, left-hand winding of line relay 100, inner right armature and back contact of cut-off relay 101, tip terminals of jack 19, plug 13, plug 6, jack 1, to the corresponding terminal and the brush of switch 35, a closed pair of contacts of keys 46, 45 and 43, outer right-hand armature and front contact of relay 57, windings of relays 59 and 60 in series to battery. Another circuit from battery, right-hand winding of line relay 100, ring contact of jack 19, plug 13, plug 6, jack 1, corresponding terminal and brush of switch 36, a closed pair of contacts of keys 46, 44, and 43, inner right-hand armature and front contact of relay 57, winding of relay 61 to ground. If the line relay 100 is in a standard condition, relay 59 operates in the first traced circuit but relay 60 does not operate as it is marginal and does not respond if the characteristics of this circuit are normal. The operation of relay 59 closes an obvious circuit for lighting of signal lamp 30, which thus indicates that a circuit of standard character is closed through the line relay 100 and the tip conductor of the circuits for answering jack 19. The operation of relay 59 also closes an obvious circuit through the upper winding of relay 63 causing the operation of this relay. The operation of relay 59 also closes partly a circuit for the upper winding of relay 64 in that a ground is applied from the armature and front contact of relay 59 through a closed pair of contacts of relay 46, to the lower armature and front contact of relay 61. The second mentioned circuit through the line relay 100 causes the operation of relay 61. Relay 61 in operating closes an obvious circuit for lighting of signal lamp 31, which thus indicates that a circuit of standard character is closed through the other winding of line relay 100 and the ring conductor of the circuit for answering jack 19. An obvious circuit is also closed by the operation of relay 61 through the lower winding of relay 63. The operation of relay 61 completes through its lower armature and front contact the previously partially traced circuit for the upper winding of relay 64 so that a circuit is now completed from battery, upper winding of relay 64, through to the ground at the armature and front contact of relay 59 so that when these two relays 59 and 61 operate, relays 63 and 64 are operated. The relay 64 in operating provides a locking circuit for itself through its lower winding, armature and front contact to ground at the left-hand armature and front contact of relay 57. This relay 64 also closes partially a circuit for relay 66 at its upper inner armature and front contact, the purpose of which will be hereinafter described. Relay 64 also at its upper outer armature and front contact closes a circuit for the operation of the cut-off relay 101 of the circuit of jack 19 and for the operation of relay 62 over a circuit as follows: battery, through adjustable resistance 73, a pair of closed contacts of key 49, resistance 70, upper outer armature and front contact of relay 64, closed contact of key 53, winding of relay 62, closed pair of contacts of keys 44 and 45, the brush and the corresponding terminal of switch 37, sleeve conductor of jack 1, sleeve terminals of jack 1, plug 6, plug 13, jack 19, winding of cut-off relay 101 to ground. This circuit causes the operation of relays 62 and 101. The operation of relay 62 closes an obvious circuit for the lighting of signal lamp 32 which indicates that a circuit of standard character is closed through the cut-off relay 101 and the conductor of the circuits for answering jack 19. It should be noted that a tester may observe the lighting of lamp 102 associated with the circuits of jack 19 on the operation of the line relay 100 and the extinguishing of this lamp on the operation of cut off relay 101. The continuity tests of the circuits for answering jack 19 are now completed and the continuity tests of the circuits for the next answering jack in the case, namely, jack 20, may be made.

It should be noted that on the operation of the cut off relay 101, the circuits for the operation of the line relay 100 and the relays 59 and 61 are open at the right hand armatures and back contacts of the cut-off relay 101. This causes the release of line relay 100 and relays 59 and 61 and the release of these last two relays causes the release of relay 63. The release of relay 63 now closes a circuit for the advancement of the selector brushes to the tip, ring and sleeve terminals for the tip, ring and sleeve conductors of the second circuit, that is, the circuit for performing the continuity tests of the circuits for jack 20. The circuits for this advance of the selectors may be traced as follows: The first circuit is closed, due to the release of relay 63 and is as follows: battery, lower winding of relay 66, a pair of closed contacts of key 49, lower armature and back contact of relay 65, upper inner armature and front contact of relay 64, armature and back contact of relay 63 to ground. This circuit causes the operation of relay 66. The operation of relay 66 opens the energizing circuit for relay 57 at its make-before-break contacts. On the release of relay 57, relay 64 is released which opens the original energizing circuit for relay 66. Relay 66 is, however, maintained operated through its upper winding, upper armature and front contact, make-before-break contact of relay 67, armature and back contact of stepping magnet 41, brush of switch 40, lower armature and front contact of relay 66, a pair of closed contacts of key 50 to ground. The operation of relay 66 thus provides through the closing of its lower armature and front contact, a circuit for the operation of stepping magnet 41 as follows: battery, winding of stepping magnet 41, the first terminal and brush of switch 40, lower armature and front contact of relay 66, a pair of closed contacts of key 50 to ground. The stepping magnet 41 operates in this circuit and moves the brushes of the switches 35 to 40 one step. As the brush of switch 40 moves from the first terminal the selector magnet 41 and relay 66 are released. When this magnet and relay are released the original energizing circuit for relay 57 is again closed through the make-before-break contact of relay 66 and through the armature and back contact of stepping magnet 40 as hereinbefore described. The continuity tests of the circuits for jack 20 may now therefore begin through the operation of relay 57 and the tip and ring connections for the line relay associated with jack 20 are closed to operate relays 59 and 60 and the operation of the line relay associated with jack 20, followed by the operation of relays 63 and 64 and the operation of the cut off relay of the circuits for jack 20 and the operation of relay 62.

The operation of the cut off relay causes, as before stated, the release of relay 63 followed by the operation of relay 66 and the advance of the selector switches 35 to 40 to the conductors of the circuits for jack 21. In this manner the continuity test of the circuits for succeeding answering jacks 21, 22 and 23 are provided for and performed in succession. As these tests are performed it will be noted that lamps 24 to 28 are lighted in succession to indicate the particular answering jack under test at any time. This is accomplished through the brush and corresponding terminals of switch 38, that is, for example, when jack 19 is tested, a circuit will be completed for lamp 24, to battery, lamp 24 through the first terminal and the brush of switch 38 to ground, and correspondingly, circuits will be closed in succession by lamps 25 to 28 as jacks 20 to 23 are tested.

If it is desired to make the above continuity tests only the key 55 should be operated simultaneously with the operation of key 52 at the beginning of the tests. If this is the case, the buzzer 78 will operate at the completion of the continuity tests for the circuits of the last jack in the group, namely jack 23, in the following manner: When the switch has finished the testing of the circuits of jack 23, the brushes of the switches 35 to 40 will be located on the fifth terminal. In this position a circuit will now be closed for buzzer 78 as follows: battery, winding of buzzer 78, left-hand closed contacts of key 55, the fifth terminal of switch 40 and its corresponding brush, lower armature and front contact of relay 66, a pair of closed contacts of key 50 to ground.

The operator hearing the sound from the buzzer 78 will then remove the plugs 13 to 17 from jacks 19 to 23 and insert these plugs in another set of five answering jacks whereupon the continuity test of the circuits for these jacks may proceed. To open the circuit for the buzzer and advance the selector switches first to the sixth terminal position and later through the seventh to the eleventh terminal position in readiness to the testing of this second set of answering jacks, key 51 will now be operated. The operation of this key closes an obvious energizing circuit for relay 67 which in operating closes at its lower armature and front contact an obvious energizing circuit to stepping magnet 41 and relay 67 provides for itself an obvious locking circuit through the armature and back contact of magnet 41 to insure the operation of magnet 41. On the operation of relay 67 relay 66 releases and opens the buzzer circuit and on the operation of magnet 41 the brushes of the switches 35 to 40 are advanced to the sixth terminal position. If the key 51 is now operated five times in succession the relay 67, and consequently, magnet 41 will operate the corresponding number of times to advance the selector switches until their brushes come to rest in their eleventh terminal position. It will be noted that in this position lamp 24 will become lighted, so, that the tester will now know that the continuity test of another set of five answering jacks may begin. By virtue of the plugs 13 to 17 of the cord 12 being inserted in said second group of answering jacks and the switches being advanced to the eleventh terminal position, the testing of the circuit for the first of these jacks will begin as relay 57 was reoperated on the release of relay 67 and the release of magnet 41 and the circuits from the tip and ring conductors of this first jack will be completed through to the relays 59 to 61 as hereinbefore described. In this manner, two successive sets of five jacks each may be tested for continuity by shifting the plugs 13 to 17 each time the buzzer 78 is heard from one set of five answering jacks to another and the key 51 has been operated the required number of times between each test of five answering jacks each to advance the selector switches 35 to 40 past terminals 6 to 10 and 16 to 20. These terminals 6 to 10 and 16 to 20 are normally reserved for the adjustment tests of the line relays associated with these two sets of answering jack circuits. Such adjustment will presently be described.

When the selector switches 35 to 40 come to the 20th terminal positions as will be the case after two sets of answering jacks have been tested for continuity of jack circuits or when both continuity and adjustment tests have been made, as will be hereinafter described, the operation of key 51 will advance the selector brushes to the 21st position in a manner as hereinbefore described and when this position is reached the selectors are automatically returned to the normal position shown in the drawing. This is accomplished as follows: In the 21st position a circuit is closed for the operation of relay 57 so that the tip and ring conductors of the test set are connected up from the brushes of switches 35 and 36 to the relays 59 and 60 and 61. Ground on the brush of switch 35 from terminal 21 causes the operation of relays 59 and 60 and the operation of relay 60 closes an obvious circuit for relay 65. Relay 65 in operating provides a locking circuit for itself to ground at the left-hand armature and front contact of relay 57. This relay 65 also closes a circuit for the operation of relay 66 as follows: battery, lower winding of relay 66, a pair of closed contacts of key 49, lower armature and front contact of relay 65, terminal 21 of the brush switch 39 to ground. Relay 66 in operating causes the advance of the selector switches 35 to 40 to the 22nd position by closing the circuit for magnet 41 to its lower armature and front contact and terminal 21 of switch 41. As the switches move from their position 21 to position 22, all of these relays are released and when the 22nd position is reached, the above operations are repeated and the switches thereby returned to normal position.

It will be noted that during these continuity tests described above, the so-called adjustment tests of the cut-off relays are automatically performed, that is, the circuits for the cut off relays completed through relay 62 are also extended through the adjustable resistance 22 which may be set to provide the proper electrical characteristics of the last circuit. If any particular cut off relay does not operate during these tests to extinguish the line lamp of the associated answering jack circuit such failure may be due to the faulty adjustment of the cut off relay or to some unstandard condition in the circuit therefor in the particular answering jack circuit under test. To ascertain the source of such failure in the operation of the cut-off relay key 53 may be operated. By operating this key, a so-called soak value of current may be placed through the cut-off relay winding by the opening of the circuit for this relay through the adjustable resistance 22 and the resistance 70 and close a connection directly from a winding of the relay 62 to battery at the now closed contacts of key 53. If this particular cut off relay now operates it would indicate that the electrical characteristics of the winding of this particular cut off relay were at fault. If relay 62 does not operate some unstandard condition exists in the sleeve conductor leading to this cut-off relay.

If it is desired to perform adjustment tests of the line relays of a particular group of five answering jacks connected for test immediately after the continuity tests of the circuits therefor and the adjustment tests of the cut-off relays have been performed, the key 55 is not operated with key 52 at the beginning of the tests but allowed to remain in a normal position. It will be noted that at the completion of the tests of the five answering jacks and while the brushes of the switches 35 to 40 are in their fifth position, a circuit will be closed to prepare the set for adjustment tests of the line relays. A circuit for starting these operations will be as follows: When the brush of switch 40 alights on the fifth terminal, a circuit will be completed for stepping magnet 41 as follows: battery, winding of stepping magnet 41, a normally closed pair of contacts of key 55, fifth terminal and brush of switch 40, lower armature and front contact of relay 66, a closed pair of contacts of key 50 to ground. The stepping magnet will now take one additional step and cause the brushes of switches 35 to 40 to contact with their sixth terminals. At the operation of stepping magnet 41, the holding circuit for relay 66 will be open at the armature and back contact of this magnet, thus allowing relay 66 to release and the original energizing circuit for relay 57 is again closed at the normal contacts of the relay 66. In this position, the circuit for the two windings of the line relay 100 will be completed to the relays 59 and 60 and 61 but it will be noted, that their circuits will be immediately opened and other circuits completed due to the operation of relay 58, under the circumstances which takes place over a circuit as follows: battery, winding of relay 58, a pair of closed contacts of key 50, a pair of closed contacts of key 55, the sixth terminal of switch 39 and the corresponding brush to ground. The operation of relay 58 opens the energizing circuit for relay 57 which in releasing opens the tip and ring conductors from the line relay 100 to the relays 59 and 60 and 61 and relay 58 closes a loop circuit from the windings of line relay 100 through the adjustable resistances 71 and 72 as follows: battery, right-hand winding of line relay 100, outer right-hand armature and back contact of cut-off relay 101, tip terminals of jack 19, plug 13, plug 6, jack 1, sixth terminal of switch 35 and the corresponding brush, a pair of closed contacts of key 46, outer right-hand armature and front contact of relay 58, adjustable resistance 71, right-hand armature and front contact of relay 69, adjustable resistance 71, a pair of closed contacts of keys 47 and inner right-hand armature and front contact of relay 58, a pair of closed contacts of key 46, the brush of switch 36 and its sixth terminal to the tip and ring terminals of jack 1, plug 6, plug 13, jack 19, right-hand inner armature and back contact of relay 101, left-hand winding of relay 100 to ground. However, it should be noted that this circuit is not completed until relay 69 is operated which takes place immediately upon the operation of relay 58. The circuit for the operation of relay 69 is as follows: battery, winding of relay 69, a closed pair of contacts of key 48, left-hand armature and back contact of relay 68, middle right-hand armature and front contact of relay 58 to ground. The resistances 71 and 72 are adjusted to cause the proper electrical condition to prevail on the tip and ring conductors for the operation of line relay 100 and to determine whether or not line relay 100 is functioning properly. These circuits through the resistances 71 and 72 will be alternately opened and closed to cause the alternate lighting and extinguishing of lamp 102 in the circuits for jack 19 and of lamp 34 in the test set. The circuits for this purpose are as follows: It will be noted that on the operation of relay 69 an obvious circuit is closed for the operation of relay 68 which in operating opens the energizing circuit for relay 69 so that when this relay releases, the relay 68 released and again closed the circuit for the operation of relay 69. As these relays 68 and 69 are slow to release, a circuit for line relay 100 will be alternately opened and closed at a definite rate and consequently, lamp 102 and lamp 34 are alternately lighted and extinguished to indicate the operation and release of the line relay. By the proper adjustments of the resistances 71 and 72 therefore, the operating and release values of the line relay 100 will be tested. By arranging the adjustment tests of the line relays so that the line lamps are alternately lighted and extinguished, a distinction is made between these tests and the continuity tests.

It should be noted that due to the fact that the relay 66 is not operated in this circuit, the selector switches 35 to 40 will not advance for the adjustment tests of the succeeding jacks in the group of jacks connected to the test set but that the selector may be advanced for the testing of these succeeding jack circuits by the manual operation of key 51. The operation of this key closed an obvious circuit for the operation of relay 67. The operation of this relay closed an obvious circuit for the magnet 41 to advance the selectors to connect the set with the circuits of the next answering jack, in this case jack 20. When now, therefore, the brushes of these switches are advanced to the seventh terminal, the circuit for relay 58 will be again closed as previously traced except that the ground will now be supplied through from the brush of switch 39 at its seventh terminal. In a similar manner the line relays of the succeeding answering jacks are tested, that is, each time key 51 is operated, the brushes of the selector switches 35 to 40 will advance the connections to a succeeding answering jack. When the fifth answering jack has been tested, a circuit will be closed for the operation of the buzzer 71 as follows: battery, winding of the buzzer 71, right-hand armature and front contact of relay 68, tenth terminal of switch 38 and its corresponding brush to ground to indicate that the adjustment test of the line relay of the five answering jack circuits has been completed.

If it is desired to test the actual operating value of a line relay, that is, in case a line relay does not operate on the proper adjustment of resistances 71 and 72, the pointers 75 may be moved toward the right until a connected line relay does operate. To permit this to be done, a key 47 will be operated. When this key is operated a circuit is closed for the operation of relay 58 as follows: battery, winding of relay 58, outer right-hand closed contact of key 47 to ground. The operation of relay 58 closes the test circuit from a line relay through the resistances 71 and 72 as hereinbefore described, and a circuit is also therefore closed for the operation of relay 69 as follows: battery, winding of relay 69, a pair of closed contacts of key 48, outer left-hand pair or closed contacts of key 47 to ground. The circuit for the line relay to be thus tested is also closed through the operation of key 47 to the milliammeter 74 as follows: from resistance 73, left-hand inner closed contacts of key 47, a pair of closed contacts of key 56 through to the milliammeter 73, a pair of closed contacts of key 49, a pair of closed contacts of key 56, inner right-hand closed pair of contacts of key 47, a pair of closed contacts of key 48, inner right-hand armature and front contacts of relay 58 so that when the slider 75 is moved toward the right and the line relay under test operates, the exact value of the current passing through this relay is registered on the milliammeter 74. That is, the actual operating value of any line relay under test may be measured in this manner.

Similarly, if it is desired to test the actual release value of any particular line relay, the key 48 may be operated. In this case relay 58 will be operated through an obvious circuit through the closed outer right-hand contacts of key 48 and relay 69 will be prevented from operating through the opening of the outer left-hand contact of key 48 so that the loop circuit will be open through slider 75 but closed through the slider 76 which may now be moved to the left until the particular line relay under test releases. It should also be noted that the operation of key 48 closes this loop circuit for the line relay through the milliammeter 74 to measure the actual value of the current at the time the line relay releases. The circuit of this loop to the milliammeter 74 may be traced as follows: resistance 71, a pair of closed contacts of key 47, inner left-hand closed contacts of key 48, a pair of closed contacts of key 56 through the milliammeter 74, a pair of closed contacts of key 49, a pair of closed contacts of key 56, inner left-hand closed contacts of key 48 to the inner right armature and front contact of relay 58.

If it is desired to measure the actual operating value of any particular cut-off relay, key 49 may be operated. In this case, the circuit from the cut-off relay will not go through resistance 70 but may be traced from the battery, through the adjustable resistance 73, right-hand inner closed contacts of key 49, a pair of closed contacts of key 56 through the milliammeter 74, a pair of closed contacts of key 56, inner left-hand closed contacts of key 49, the closed contacts of key 53, winding of relay 62 and out through the winding of the particular cut off relay under test as hereinbefore traced to ground. The slider 76 may now be moved across the resistance 73 until the cut-off relay connected in this circuit operates and the operating value of the current flowing in the circuit may be noted on the milliammeter 74.

The purpose of the key 56 in the circuits above mentioned to the milliammeter 74 is for the purpose of reversing the current flow through the meter in case the connections from the battery at the jack circuits are poled in the opposite direction from the usual connections, a condition that the tester will be aware of when conducting tests in different types of switch board as is well known in the art.

If during the continuity tests of a group of answering jack circuits, it is found that a particular jack circuit does not function properly the tests of any one of these circuits may be repeated by operating key 50 at the time the unstandard condition is observed. The operation of key 50 closes an obvious circuit for the operation of relay 57. This relay in operating completes a circuit for the particular jack circuit under test through to the relays 59 and 60 and 61 and the operation of the test circuits are repeated in the same manner except for the circuit for the advance of the selector switches normally completed through the lower armature and front contact of relay 66 and that is in this case opened at the outer left-hand contacts of key 50. When, therefore, relay 66 operates on the release of relay 63, the selector switches are not advanced. Relay 57, however, is released as under normal conditions in the operation of relay 66 causing the release of relay 64 which in turn, causes the release of relay 66 to again complete the circuit for relay 57. In this manner the test for the particular jack circuit on which an unstandard condition has been observed is repeated time and again until key 50 is released at which time the tests of the succeeding jack circuits may proceed in the usual manner.

The unstandard conditions above referred to that may occur during the continuity testing of jack circuits and adjusting tests of cut off and line relays may be due to various causes. For example, the electrical conditions on the tip conductor of a jack circuit may be such as to cause the marginal relay 60 to operate in series with relay 59. The marginal characteristics of relay 60 may be such as to prevent its operation on currents through the tip conductor circuits below a certain predetermined value. This value may be the maximum allowable for tip conductor circuits through line relays and in this manner whenever relay 60 does operate it will be known that the current through the particular tip conductor through the line relay under test is excessive. If relay 60 operates, an obvious circuit is closed for the operation of relay 65 which in turn closes an obvious circuit for the lighting of lamp 63 to indicate this unstandard condition. Relay 65 locks to relay 57. It should be noted that under these circumstances the switches will not advance at the completion of the test of this particular jack circuit as relay 65 in operating will prevent the operation of relay 66 on the release of relay 63.

Other unstandard conditions may be that relays 59 and 61 fail to operate altogether or fail to release when the cut-off relay of the jack circuit under test operates. In these cases the circuit for the operation of relay 66 will not be completed so that the selector switches will not advance and the signal lamps 30, 31, and 32 will then indicate the exact condition or cause of failure of the jack circuit under test. For example, if lamps 30 and 31 fail to light, this will indicate that either the tip and ring conductors are reversed or that they are open. If lamp 30 is lighted and lamp 31 fails to light, this will indicate that the ring conductor is open. If lamp 30 fails to light and lamp 31 is lighted, this will indicate that the tip conductor is open. To ascertain if the tip and ring conductors are reversed key 43 may be operated and if lamps 30 and 31 then light, it indicates a reversal of these conductors. If lamps 30 and 31 are lighted and lamp 32 fails to light, this will indicate that the sleeve conductor is open. If the lamp 32 and lamps 30 or 31 are lighted, this will indicate that the cut off relay has failed to open the tip or ring conductors. If the key 53 is then operated and lamp 32 and lamps 30 or 31 are lighted, this will indicate that there is a ground on the sleeve conductor or that there is a false ground or battery on the tip conductor or the ring conductor. If the lamp 32 and lamp 33 are lighted, this will indicate that there is a ground between the cut off relay and the line relay on the tip conductor. When the lamps 30, 32 and 33 are lighted, this will indicate that there is a ground between the answering jack itself and the cut-off relay on the tip conductor. If it is thought that the ring and sleeve conductors are reversed key 44 may be operated, and if the test then proceeds in the regular manner, it indicates that the analysis was correct. Similarly if it is thought that the tip and sleeve conductors are reversed the key 45 may be operated and if the test then proceeds in the regular manner, it indicates that the analysis in this respect was correct. It will thus be seen that by these various combinations of signals and by the manipulation of the reversing keys as described above, the exact condition of a particular answering jack circuit under test may be indicated.

If it is desired to test any one of the answering jack circuits to the exclusion of all others, key 51 may be operated a number of times until the selector switches have been advanced to the jack circuit it is desired to test, which will be indicated by the lighting of a particular one of the lamps 24 to 28, corresponding to the jack circuit to be tested. If then the start key 52 is operated, the testing of this circuit may begin and if the key 50 is also operated, the testing of this circuit may be repeated.

It should be noted that the handles or holders 11 and 18 may be equipped with push buttons 80 and 81 connected in an obvious manner to cause the operation of relay 67 if either one of these buttons are depressed to close their contacts. These buttons, therefore, serve the same purpose as key 51 and it is readily seen from the above description of the various manipulations of key 51 that it is of a decided advantage to have an arrangement of this sort. These manipulations may be controlled from the handles of the multiple plugs, i. e., by this arrangement quick advancement of the switches may be made when the adjustment tests of the line relays are carried on and also when it is desired to test a particular jack circuit to the exclusion of the others.

This testing set is also arranged for testing other types of answering jack circuits beside the standard type referred to above, such as the kind in which direct ground is connected to the tip conductor. One circuit of this type is shown in Fig. 3. Another type of jack circuits that may be tested is the kind in which the connected subscriber's line is equipped for coin collecting service. One of these last types of circuits is shown in Fig. 4.

If a test is to be made on the type of circuit shown in Fig. 3, the procedure is the same as for the standard jack circuit except that key 42 is operated. In this case, therefore, the closing of the right hand contacts of key 42 includes a resistance 82 to ground in parallel with the winding of relay 61 so as to provide sufficient current flow through the ring conductor of the jack circuit under test to cause the line relay 300 to operate, as it will be noted that in this case both windings of relay 300 are connected in parallel from battery to the ring conductor. As there is a direct ground on the tip conductor, both relays 59 and 60 will operate on this test. The operation of relay 60 causes the operation of relay 65. This lamp 33 is, however, not lighted as the circuit therefor is opened at the right hand contacts of key 42. The closed left hand contacts of key 42 provide a connection as shown between the two leads opened by the lower armature and back contact of relay 65 so that the circuit of the test set will operate in the same manner as in the original test, i. e., when relay 63 releases the selector switches will be advanced to the next jack circuit through the operation of relay 66, through the circuit closed, therefore, at the above mentioned closed contacts of key 42.

If jack circuits of the other type shown in Fig. 4 are to be tested the operation of the test set is identical with the functions when an ordinary jack circuit is tested except that in this case the key 46 will be operated to cause the circuit to function properly. The operation of this key reverses the tip and ring conductors, for it will be noted that the tip conductor in this type of jack circuit is connected to battery through a winding of the line relay while the ring conductor is not connected through the line relay but directly to the subscriber station. Hence, in performing a continuity test only relay 61 will be operated as relay 59 is not connected in any circuit. Therefore, to cause the operation of relay 64 which formerly received its ground through the operation of relay 59, a connection for this relay is now closed directly to ground through a pair of left hand contacts of key 46 so that the test will proceed in the regular manner to advance the selector switches from one jack circuit to another. In performing adjustment tests of the line relays in this type of jack circuits there is provided, due to the closed outer left hand contacts of key 46, a ground connection through a compensating resistance 83 for the circuit through the line relay under test, through the tip conductor and the adjustable resistances 71 and 72. A ground at key 46 also puts the relay 65 under control of relay 59 in this case so that if a ground is present on the ring conductor of any of the answering jack circuits tested, the relay 59 by being transferred to the ring conductor by key 46 will operate and thus cause the operation of relay 65 to prevent the switches from advancing for the testing of the next jack circuit until this unstandard condition is noted by the tester.

The procedure in testing the operation of the test set itself is as follows: The jacks 90 to 94 may for that purpose be connected, respectively, to jacks 1 to 5 by means of the cord 12 and the functions of the set when a continuity test is made, are tested through the operation taking place due to the connection of the artificial line to the jacks 90 and 91. To start testing the keys 52 and 55 are operated. It is readily seen that the relays 59 and 60 and 63 will operate through their respective tip, ring and sleeve conductors of jack 90 as the battery and ground are connected over the tip and ring conductors through suitable resistances simulating the windings of the line relay while the sleeve conductor is connected through the cut-off relay 95 to ground. In this manner the circuits used for the continuity tests in the test set itself are tested and as the selector switches will advance two steps the functions of the stepping magnet 41 and its associated circuits are also tested as the artificial line connections are the same for jack 91 as they were for jack 90. If, therefore, the test set circuits are functioning properly, the test set should respond as if two successive jack circuits connected to jacks 1 and 2 are tested and the switches should advance to test jack 92. In this the third position, however, it will be noted that the artificial line circuit connections for jack 92 is such as to simulate a ground on the tip conductor of a jack tested between the cut-off relay and the line relay, i. e., a ground is connected through a comparatively low resistance 98 to the tip conductor, causing relays 59 and 60 to operate and the circuits to function as hereinbefore described when an unstandard condition of this kind occurs. In other words, the operation of the marginal relay 60 and relay 65 are tested in this position. If now the key 51 is operated to advance the switches to the 4th position so as to cause test to be made through the jack 93, in this position the ring and sleeve conductors of the jack 93 are connected as under normal conditions while the tip conductor is so connected as to simulate a condition where it is not broken by the operation of the cut off relay. In this case lamps 30 and 32 remain lighted at the same time. If the switches are now advanced to the 5th position, i. e., to cause tests to be made over jack 94, it will be noted that the ring conductor of this jack is not broken by the operation of the cut off relay 95 so that the lamps 31 and 32 are lighted at the same time. If tests like these are made on the test set itself it may be inferred that the functioning of the set when used will be satisfactory.

What is claimed is:

1. In a system for testing telephone circuits, means for temporarily and simultaneously connecting a testing device to a plurality of telephone circuits, means for automatically and successively testing said circuits characterized in this that means is provided for determining if the current through line relays associated with said circuits is above or below a certain value and in this that means is provided for preventing the advance of the automatic testing from one circuit to another responsive to a condition set up in the testing device when the current through a line relay under test is below said certain value and in this that means is provided for indicating when said last mentioned condition exists.

2. In a system for testing telephone circuits, means comprising a plurality of plug-ending cords with the plugs at each end assembled in a common handle for temporarily and simultaneously connecting the testing device to a plurality of telephone circuits, means for automatically and simultaneously performing certain tests upon said circuits, and means operative from either of said handles for performing other tests upon said circuits.

3. In a system for testing telephone circuits, means for temporarily and simultaneously connecting a testing device to a plurality of telephone circuits, means for automatically and successively performing certain tests upon said circuits, means for manually performing certain other tests upon said circuits, and means for indicating when the above mentioned tests of all of the telephone circuits have been performed.

4. In a system for testing telephone circuits, means for temporarily and simultaneously connecting a testing device to a plurality of telephone circuits, means for automatically and successively performing certain tests upon said circuits, means manually performing certain other tests upon said circuits, means for indicating when either of said types of tests is in progress, and means for indicating when said second mentioned type of tests is completed.

5. In a system for testing telephone circuits, means for temporarily and simultaneously connecting a testing device to a plurality of telephone circuits, means for automatically and successively performing certain tests upon said circuits, means for manually performing certain other tests upon said circuits, and means whereby said testing device may itself be tested, said last mentioned means characterized by the provision of means for testing the normal functions of the testing device and by the provision of means for simulating unstandard conditions such as may be encountered during the operation of the testing device and for testing the device under such circumstances.

In witness whereof, we hereunto subscribe our names this 14th day of January, A. D. 1926.

JOHN W. VAN DE WATER.
BERT R. BLAIR.